(12) United States Patent
Armstrong

(10) Patent No.: US 6,343,991 B1
(45) Date of Patent: *Feb. 5, 2002

(54) GAME CONTROL WITH ANALOG PRESSURE SENSOR

(76) Inventor: Brad A. Armstrong, P.O. Box 1419, Paradise, CA (US) 95967

(*) Notice: Subject to any disclaimer, the term of this patent is extended or adjusted under 35 U.S.C. 154(b) by 0 days.

This patent is subject to a terminal disclaimer.

(21) Appl. No.: 09/510,572

(22) Filed: Feb. 22, 2000

Related U.S. Application Data

(63) Continuation of application No. 08/942,450, filed on Oct. 1, 1997, now Pat. No. 6,102,802.

(51) Int. Cl.⁷ .................................................. G09G 5/00
(52) U.S. Cl. ....................................................... 463/37
(58) Field of Search ................. 463/36, 37; 273/143 B; 345/156, 159

(56) References Cited

U.S. PATENT DOCUMENTS

| 3,806,471 A | 4/1974 | Mitchell |
| 4,469,330 A | 9/1984 | Asher |
| 4,687,200 A | 8/1987 | Shirai |
| 5,207,426 A | 5/1993 | Inoue et al. |
| 5,459,487 A | 10/1995 | Bouton |
| 5,510,812 A | 4/1996 | O'Mara et al. |
| 5,565,891 A | 10/1996 | Armstrong |
| 5,589,828 A | 12/1996 | Armstrong |
| 5,602,569 A | 2/1997 | Kato |
| 5,644,113 A | 7/1997 | Date et al. |
| 5,689,285 A | 11/1997 | Asher |
| 5,764,219 A | 6/1998 | Rutledge et al. |
| 5,999,084 A | 12/1999 | Armstrong |

FOREIGN PATENT DOCUMENTS

| JP | 5-87760 | 11/1993 |
| JP | 7302159 | 11/1995 |

*Primary Examiner*—Rinaldi I. Rada
*Assistant Examiner*—John Paradisco

(57) ABSTRACT

A game controller of the type held in two hands simultaneously for controlling electronic games, including a housing, a plurality of depressible surfaces at least in-part exposed on the housing with the depressible surfaces in operational association with electricity manipulating devices contained within the housing and controlled by depression of the depressible surfaces for manipulating electrical outputs at least in-part useful for controlling electronic games. At least one of the electricity manipulating devices is a pressure-sensitive variable-conductance sensor for creating an analog electrical output proportional to varying physical pressure applied to at least one depressible surface. The analog electrical output is interpreted and utilized in controlling the action intensity of electronic game character imagery. Also disclosed are methods of use and manufacture of game controllers having at least one pressure-sensitive analog sensor.

74 Claims, 8 Drawing Sheets

GAME CONTROL WITH ANALOG PRESSURE SENSOR

This is a Rule 1.53(b) continuation application of my U.S. application Ser. No. 08/942,450 filed Oct. 1, 1997, now U.S. Pat. No. 6,102,802 (to be filled in later), to which the benefit of the earlier filing date is claimed for the common matter.

BACKGROUND OF THE INVENTION

1. Field of the Invention

The present invention relates to controllers of the type used and held by two hands simultaneously to control visual imagery shown on a visual display. More specifically, the present invention pertains to a two hand held controller with analog pressure sensor(s) for controlling video game imagery thereof, and other electronically generated imagery. Methods of use and manufacturing are also disclosed.

2. Description of the related Prior Art

There are many prior art game controllers for use in controlling imagery. A typical prior art game controller is shown in U.S. Pat. No. 5,207,426 issued May 4, 1993 to Y. Inoue et al and assigned to Nintendo Co. Ltd. The Nintendo controller is a typical example of a game controller having multiple inputs capable of manipulating multiple-axes, such as with the included cross-shaped rocker key pad, and numerous buttons and depressible surfaces. The Nintendo controller includes a housing sized to be grasped and held simultaneously by two hands of a human user with thumbs of the grasping hands remaining free of grasping responsibilities; the housing including a right-hand area and a left-hand area, the right-hand area being an area for grasping by the user's right hand, the left-hand area being an area for grasping by the user's left hand; a plurality of depressible surfaces (e.g., buttons and cross-shaped key pad) each at least in-part supported by the housing and each at least in-part exposed on the housing in at least one area for operation by the user's thumbs and fingers. The plurality of depressible surfaces (most of the depressible surfaces) are positioned on the housing to be within reach of the user's thumbs with the user's hands grasping the housing; each depressible surface or member of the plurality of depressible surfaces or members is individually operatively associated with an individual electricity manipulating device (e.g., a simple momentary-On switch to close an opening in a circuit), one electricity manipulating device per each depressible surface of the plurality of depressible surfaces. Each electricity manipulating device (momentary-on switch) is contained at least in-part within the housing and capable of electrical output manipulation upon physically applied depressive pressure on the associated depressible surface. The switches (electricity manipulating devices) are either On or Off and provide corresponding all or nothing outputs. These simple On/Off switches are not used to provide the user proportional or analog control.

Although there have been tens of millions of such prior art controllers as described above sold by numerous manufacturers despite the significant disadvantages of simple On/Off controls, I believe such a controller can be improved, so does Nintendo Co. Ltd. In a more recent game controller sold by Nintendo, referred to as the N64 controller, the controller has incorporated in a center portion a proportional joystick having rotary optical encoders to achieve the proportional effect. The proportional joystick is applied in an attempt to overcome the significant disadvantages of the four simple On/Off switches located under the typical cross-shaped rocker pad. The proportional joystick includes at least two major disadvantages which are overcome by the present invention. The first disadvantage is cost of manufacture, and the second is confusion of the user. In an controller to be made in millions of units, two relatively expensive optical encoders, a complex gimble, multiple mechanical parts specific for the joystick, etc. creates an additional substantial cost which is very high. The second disadvantage is confusion of the user in that the typical user has become commonly accustomed to use of the cross-shaped key pad with the left thumb. The presentation of the option of the proportional joystick with the N64 controller often leads to confusion as whether to use the cross-shaped key pad or the joystick, especially for beginning users and potential buyers.

Clearly there is great advantage to the user's enjoyment of the game by allowing the user proportional or variable control.

The primary emphasis of this disclosure is to teach analog pressure sensor(s) embodiment in a controller having only a single housing structured to be held in the user's two hands simultaneously. Nevertheless, a joystick type of controller can be greatly advantaged by embodiment of analog sensors as described herein. The joystick type controller may be held in two hands simultaneously but it is not a single housing held in two hands. Rather, a joystick includes two housings, a base housing and a handle housing neither of which are designed to be held in two hands simultaneously. The joystick type controller may be greatly advantaged by inclusion of depressible surfaces (buttons and/or triggers) operating analog sensors as described herein. Such embodiments will become apparent to those skilled in the art with a study of this disclosure. On the other hand, mouse type controllers have a single housing but the single housing is not designed to be held in two hands simultaneously and therefore such type controllers are not considered relevant to the present invention.

Other related prior art of which I am aware and believe to be cumulative to the aforementioned includes the following U.S. Pat. No. 4,687,200 issued Aug. 18, 1987; U.S. Pat. No. 5,644,113 issued Jul. 1, 1997; U.S. Pat. No. 5,602,569 issued Feb. 11, 1997; U.S. Pat. No. 4,469,330 issued Sep. 4, 1984; U.S. Pat. No. 5,459,487 issued Oct. 17, 1995. Also U.S. Pat. No. 5,565,891 issued Oct. 15, 1996 and U.S. Pat. No. 5,589,828 issued Dec. 31, 1996 to the present Inventor.

The present invention solves the aforementioned disadvantages and provides significant additional benefits and advantages.

SUMMARY OF THE INVENTION

The following summary and detailed description is of preferred structures and best modes for carrying out the invention, and although there are clearly variations which could be made to that which is specifically herein described and shown in the included drawings, for the sake of brevity of this disclosure, all of these variations and changes which fall within the true scope of the present invention have not been herein detailed, but will become apparent to those skilled in the art upon a reading of this disclosure.

The present invention involves the use of structures (pressure sensors) having pressure-sensitive variable-conductance material across proximal circuit traces in order to provide variable output. Such variable output is useful for control of action intensity of electronic imagery in proportion to applied physical pressure in the depression of familiar control surfaces of a two hand held game controller. Improved methods pertaining to using and manufacturing game controllers are also herein disclosed.

Applied physical pressure is provided by a user of the present controller depressing a button or like depressible surface (e.g., cross-shaped key pad or finger depressible trigger which is commonly a pivotal member) which applies pressure onto pressure-sensitive variable-conductance material which, dependant upon the applied pressure, alters its conductivity (i.e., resistive or rectifying properties dependant on pressure sensor material utilized) and thereby provides analog electrical output proportional to the applied pressure. The analog electrical output of the variable-conductance material is output to an image generation machine as a signal at least representational of the analog electrical output for controlling electronic imagery.

Examples of use of the invention (controller) in a game for control of action intensity of the electronic imagery can be to simply have a simulated character walk with low depressive pressure applied, walk faster with increased depressive pressure applied, and run with a relatively high depressive pressure applied to a single depressible surface depressible individual button of the controller in accordance with the present invention. The user can choose the action intensity of imagery by applying appropriate depressive pressure to depressible surfaces of the depressible individual buttons of the controller. In a second example, a race car can veer slightly with a low depressive pressure and turn sharply with a high depressive pressure. In an example of typical right thumb use (or finger of the right hand as is typical in joystick use) of the controller, variable depressive pressure can control variable fire rate of a gun or variable jumping height of a character, etc.

The present invention in one embodiment involves a game controller sized and shaped to be grasped and held simultaneously by two hands of a human user with thumbs of the grasping hands remaining substantially free of grasping responsibilities. The thumbs are used in depressing a plurality of depressible surfaces, the depressible surfaces each at least in-part exposed on the housing outer surface. A plurality of electricity manipulating devices are contained within the housing in operable association with the plurality of depressible surfaces for manipulating electrical outputs with depression by the thumbs (or fingers) of the plurality of depressible surfaces and physical pressure applied by the depression. One or more of the electricity manipulating devices are analog pressure-sensitive variable-conductance electrical devices (sensors) for varying electrical output proportional to varying physical pressure applied by the user's thumb or fingers.

The controller of this disclosure, which can be used and manufactured as herein described, is a controller which the user holds or grasps in both hands simultaneously during operation (depressing of depressible surfaces) of the controller, and the two handed holding provides advantages for certain imagery manipulations which cannot be obtained with single hand held controllers such as a mouse. The ability to use and the actual use of two hands simultaneously on a controller allows what I call "full involvement" of the user, wherein the user can involve both hands in the control of imagery and utilizing, in general terms, the specialized abilities of the differentiated halves of his or her brain. Typically the left half of the brain of a user mostly controls the right arm and hand, and the right half of the brain mostly controls the left arm and hand. Generally speaking, for most users of a controller, it is much more intuitive and natural to use the right hand digits for certain types of control functions, such as for example, critical timing of functions such as those associated with firing a simulated gun, or precise timing in jumping of a simulated character of an electronic game. Typically, the left hand and digits are used to control functions which are more spatial in nature, such as for aiming functions which might be associated with steering a simulated car, airplane or controlling directional movement of a character such as the running direction of a simulated person. The present two hand held controller allows for placement of depressible control surfaces for certain functions in areas of the controller which are generally most suitable for typical human users. Additionally, a two handed controller provides the user the advantageous ability to hold the controller in both hands with the controller in the user's lap or held in front of the user and free of the constraints of needing a desk top or like surface on which to rest the controller.

An object of the present invention is to provide a game controller having thumb or finger (digit) depressible pressure-sensitive proportional (i.e. analog) control(s), thus the user can control the action intensity of the game imagery by the degree of pressure exerted on a depressible surface.

Another object of the present invention is to provide the above in a structural arrangement familiar to current game controller users, thus no secondary expensive proportional joystick is required when proportional controls are applied to a cross-shaped rocker key pad.

Another object of the present invention is to provide an inexpensive to manufacture analog input controller.

Another object of the present invention is to provide a game controller in which right hand thumb buttons may also be pressure-sensitive proportional (analog input) control(s).

Another object of the present invention is to provide an improved method of using a game controller connected to an image generation machine with visual display, in which a user depresses depressible surfaces using hand digits on a game controller to manipulate imagery on the display, wherein depressing of at least one of the depressible surfaces with varying degrees of pressure manipulates imagery of the display in proportion to the degree of depressive pressure.

Another object of the present invention is to provide a method of controlling action intensity of imagery within a visual display of the type associated with an electronic game allowing user manipulation of action of imagery within the visual display by way of depressing a depressible surface onto a pressure-sensitive variable-conductance sensor connected to electronics within a two hand held game controller linked to an image generation machine such as a game console or computer which in turn is linked to the display, and wherein depressing of a depressible surface with varying degrees of pressure varies the conductance of the pressure-sensitive variable-conductance sensor, thereby the action intensity of the imagery can be proportional to the degree of depressive pressure.

Another object of the present invention is to provide an improved method of manufacturing a two hand held type game controller including installing pressure-sensitive variable-conductance material for varying electrical output of circuitry in proportion to user applied pressure to a depressible surface.

These, as well as additional objects and advantages will become increasingly appreciated with continued reading and with a review of the included drawings.

BEST MODES FOR CARRYING OUT THE INVENTION

Figure 1:
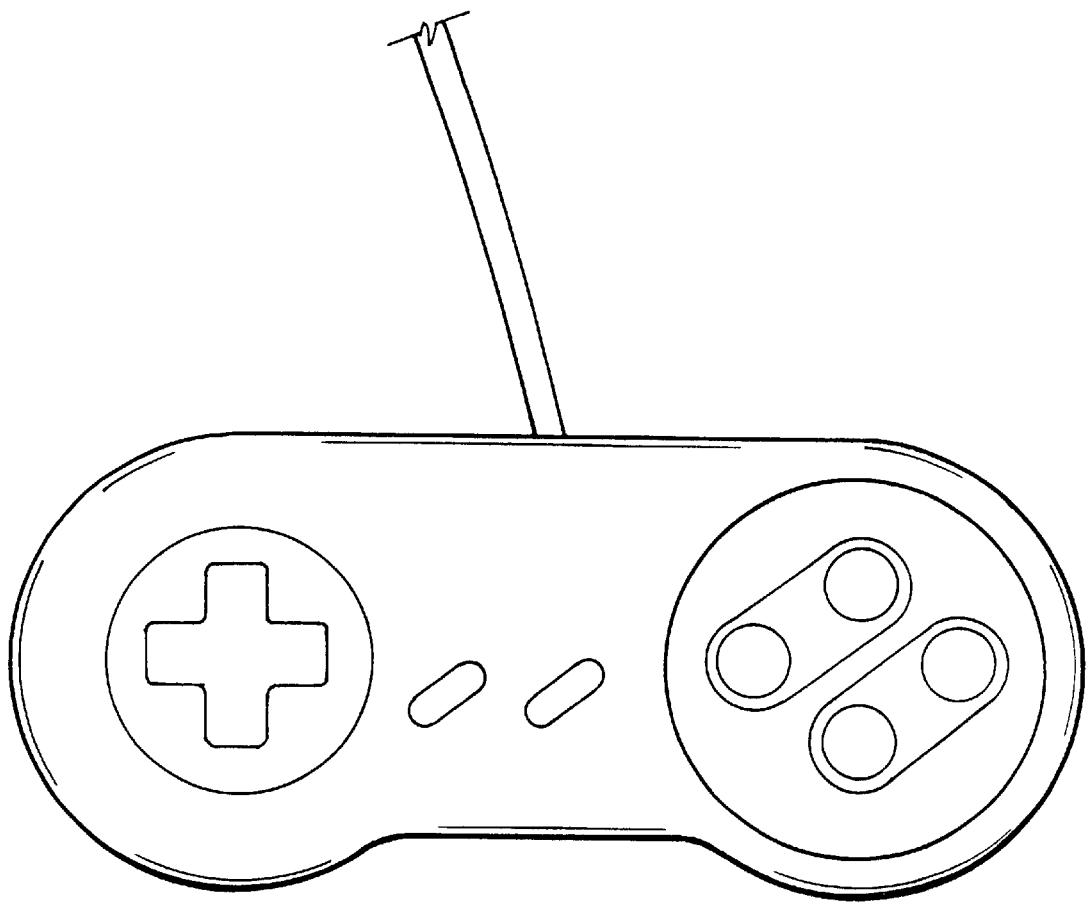
FIG. 1 shows a traditional prior art game controller commonly referred to as a game pad having a left hand area and a right hand area with the left hand area having a cross-shaped rocker pad depressible in four codependant areas, under each area is an associated On/Off momentary-On switch (electricity manipulating devices), four switches, one under each depressible area. The right hand area has depressible individual buttons located over On/Off momentary-On switches (electricity manipulating devices).
Figure 2:
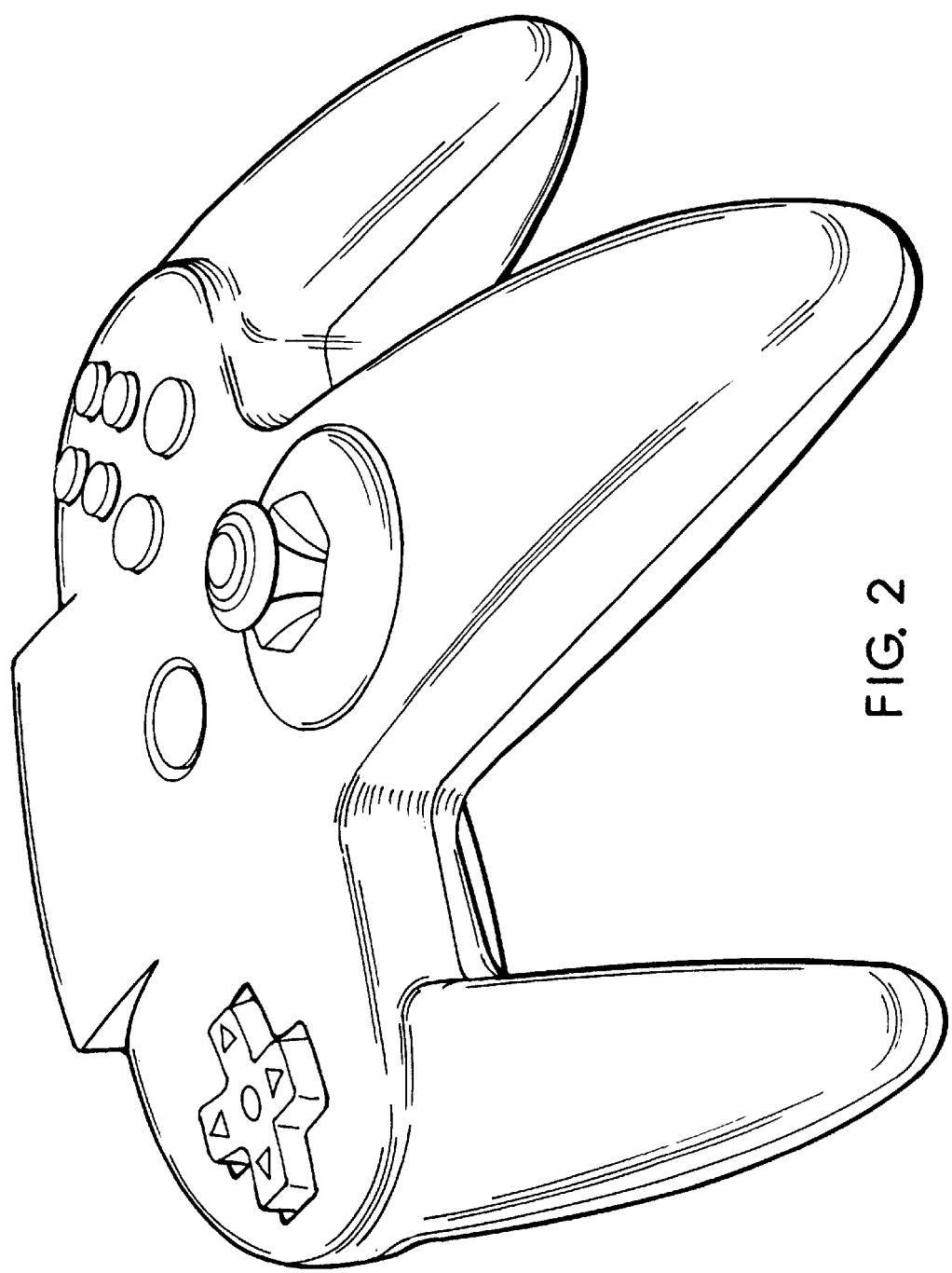
FIG. 2 shows a Nintendo N64 prior art game controller. This controller illustrates the growing need for variable or analog input control in the incorporation of the complex rotary encoder joystick. This controller has typical traditional right hand area depressible buttons and also a typical cross-shaped depressible rocker pad in the left hand area.

Referring now to drawing FIGS. 3–11 for descriptions of preferred embodiments and best modes for carrying out the invention. As previously mentioned, the present invention includes a game controller which is a two hand held controller sized and shaped to be grasped and held simultaneously by two hands of a human user with thumbs of the grasping hands remaining substantially free of grasping responsibilities so as to be available and useful in depressing a plurality of depressible surfaces 22 each at least in-part exposed on housing 20 to be accessible by the user's digits. A plurality of electricity manipulating devices 24 are contained (or at least in part contained) within housing 20 in operable association with the plurality of depressible surfaces 22 for manipulating electrical outputs with depression by the user's hand digits (thumbs or fingers) of the plurality of depressible surfaces 22. Electricity manipulating devices 24 in this disclosure can be any electrical device such as simple Off/On (momentary-On) switches as are commonly used in prior art game controllers, but with the present invention at least one of the electricity manipulating devices 24 is an analog pressure-sensitive variable-conductance sensor 26 for varying electrical output proportional to varying physical pressure applied by the user's thumb or fingers on a depressible surface 22 positioned to apply pressure to pressure-sensitive variable-conductance material 36 of sensor 26 as will be detailed.

Figure 3:
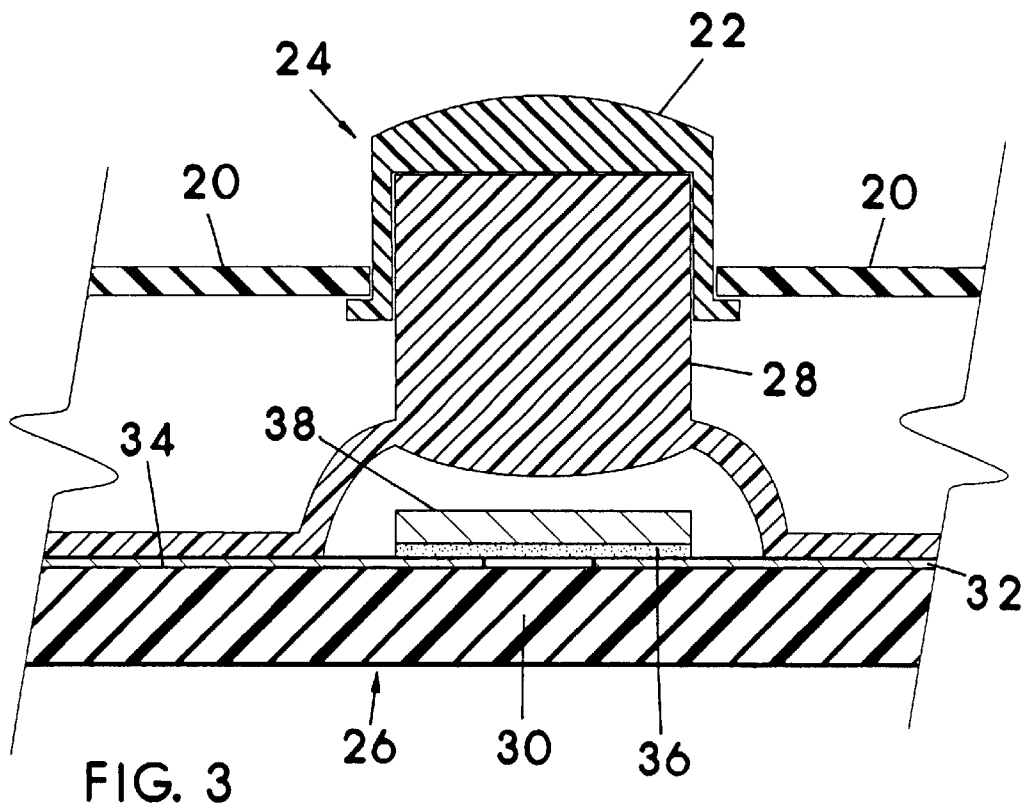
FIG. 3 shows a cross section view of a resilient dome cap mounted over a circuit board having a first and a second circuit trace including pressure-sensitive variable-conductance material in a sensor arrangement in accordance with the present invention.

Shown in FIG. 3 is a pressure-sensitive variable-conductance sensor 26 or analog sensor as it may installed by a manufacturer within a game controller in accordance with the present invention. Resilient dome cap 28 is shown made of rubbery material, such as injection molded silicone rubber, mounted over a circuit board 30 having a first circuit trace 32 and a second circuit trace 34 and including pressure-sensitive variable-conductance material 36 contacting both traces 32, 34, and an electrically conductive plate 38 is shown atop pressure-sensitive variable-conductance material 36. An underside portion of depressible surface 22 is shown atop dome cap 28. Dome cap 28 is a resilient dome providing a return spring lifting depressible surface 22 and provides or serves the purpose in this example of supporting depressible surface 22 raised upward until manually depressed to cause the lower or inner surface of dome cap 28 to press against plate 38 which in turn presses against pressure-sensitive variable-conductance material 36 which, as will be detailed, changes its conductivity with applied pressure to alter the conductance of the electrical path provided thereby between the first and second conductive traces 32 and 34 which are in close proximity to one another yet separated. Sensor 26 can be used in replacement of a simple momentary-On switch within a game controller wherein a momentary-On switch simply closes the circuit across the first and second traces 32 and 34 while the user presses on depressible surface 22 and the closed circuit outputs a known and fixed output (On or Off, or open or closed), while with the application of sensor 26 depressing of depressible surface 22 provides variable electrical flow across the first and second circuit traces 32, 34 varying in proportion to the degree of depressive pressure applied by the user's thumb or finger on the top or upper exposed portion of depressible surface 22. Such an arrangement allows a voltage/current to be applied to first circuit trace 32 wherein current flows from first circuit trace 32 through pressure-sensitive variable-conductance material 36 into conductive plate 38 through pressure-sensitive variable-conductance material 36 and into second circuit trace 34. Voltage/current can be regulated and varied by way of applied physical pressure such as onto plate 38 to compress material 36 which alters the conductivity of the circuit at least in-part defined by circuit traces 32 and 34.

Pressure-sensitive variable-conductance material 36 is an important aspect of the present invention. Variable conductance can be achieved with materials having either variable resistive properties or variable rectifying properties. For the purpose of this disclosure and the claims, variable-conductance means either variably resistive or variably rectifying. Material having these qualities can be achieved utilizing various chemical compounds or formulas some of which I will herein detail for example. Additional information regarding such materials can be found in U.S. Pat. No. 3,806,471 issued to R. J. Mitchell on Apr. 23, 1974 describing various feasible pressure-sensitive variable-conductance material formulas which can be utilized in the present invention. While it is generally anticipated that variable resistive type active materials are optimum for use in the pressure sensor(s) in the present invention, variable rectifying materials are also usable.

An example formula or compound having variable rectifying properties can be made of any one of the active materials copper oxide, magnesium silicide, magnesium stannide, cuprous sulfide, (or the like) bound together with a rubbery or elastic type binder having resilient qualities such as silicone adhesive or the like.

An example formula or compound having variable resistive properties can be made of the active material tungsten carbide powder (or other suitable material such as molybdenum disulfide, sponge iron, tin oxide, boron, and carbon powders, etc.) bound together with a rubbery or elastic type binder such as silicone rubber or the like having resilient qualities. The active materials may be in proportion to the binder material typically in a rich ratio such as 80% active material to 20% binder by volume ranging to a ratio 98% to 2% binder, but can be varied widely from these ratios dependant on factors such as voltages to be applied, level or resistance range desired, depressive pressure anticipated, material thickness of applied material 36, surface contact area between material 36 and conductive traces such as traces 32 and 34, whether an optional conductive plate such as plate 38 is to be used, binder type, manufacturing technique and specific active material used.

A preferred method of manufacture for portions of that which is shown in FIG. 3 is to create a sheet of pressure-sensitive material 36 adhered to a conductive sheet such as steel, aluminum or copper, for example, by applying a mixture of the still fluid material 36, before the binder material has cured to the conductive sheet in a thin even layer. After the binder material (material 36) has cured and adhered to the conductive sheet, a hole punch is used to create circular disks of the lamination of the conductive sheet (plate 38) adhered to material 36. The disks may then be secured to the circuit board and in contact with circuit traces 32 and 34. Securing may be accomplished with the use of adhesives such as the same binder such as silicone rubber or adhesive as used in the formula to make material 36.

Figure 8:
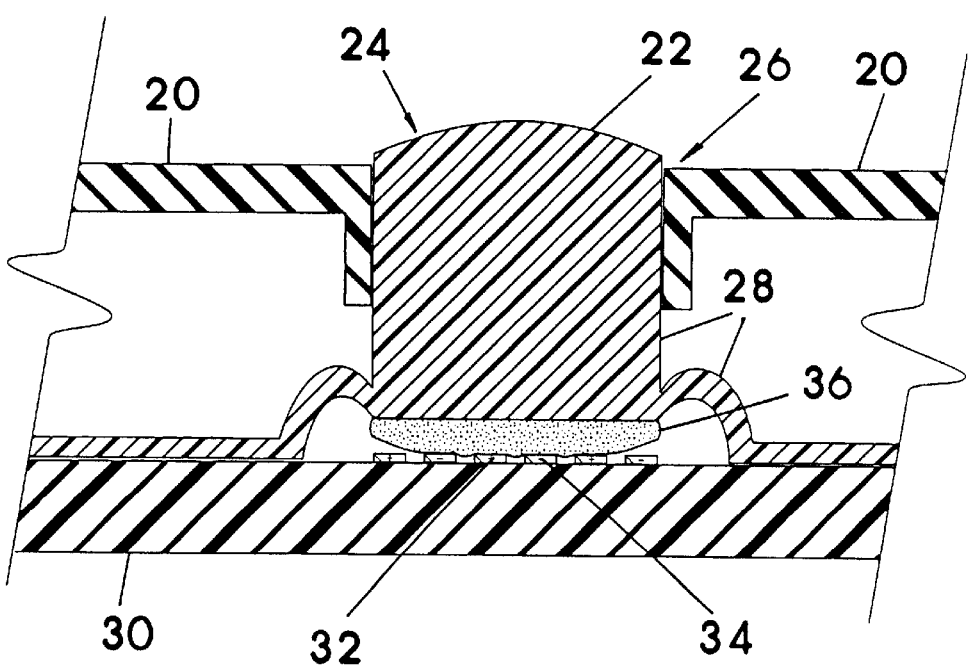
FIG. 8 shows the sensor of FIG. 7 in a depressed or activated state.
Figure 9:
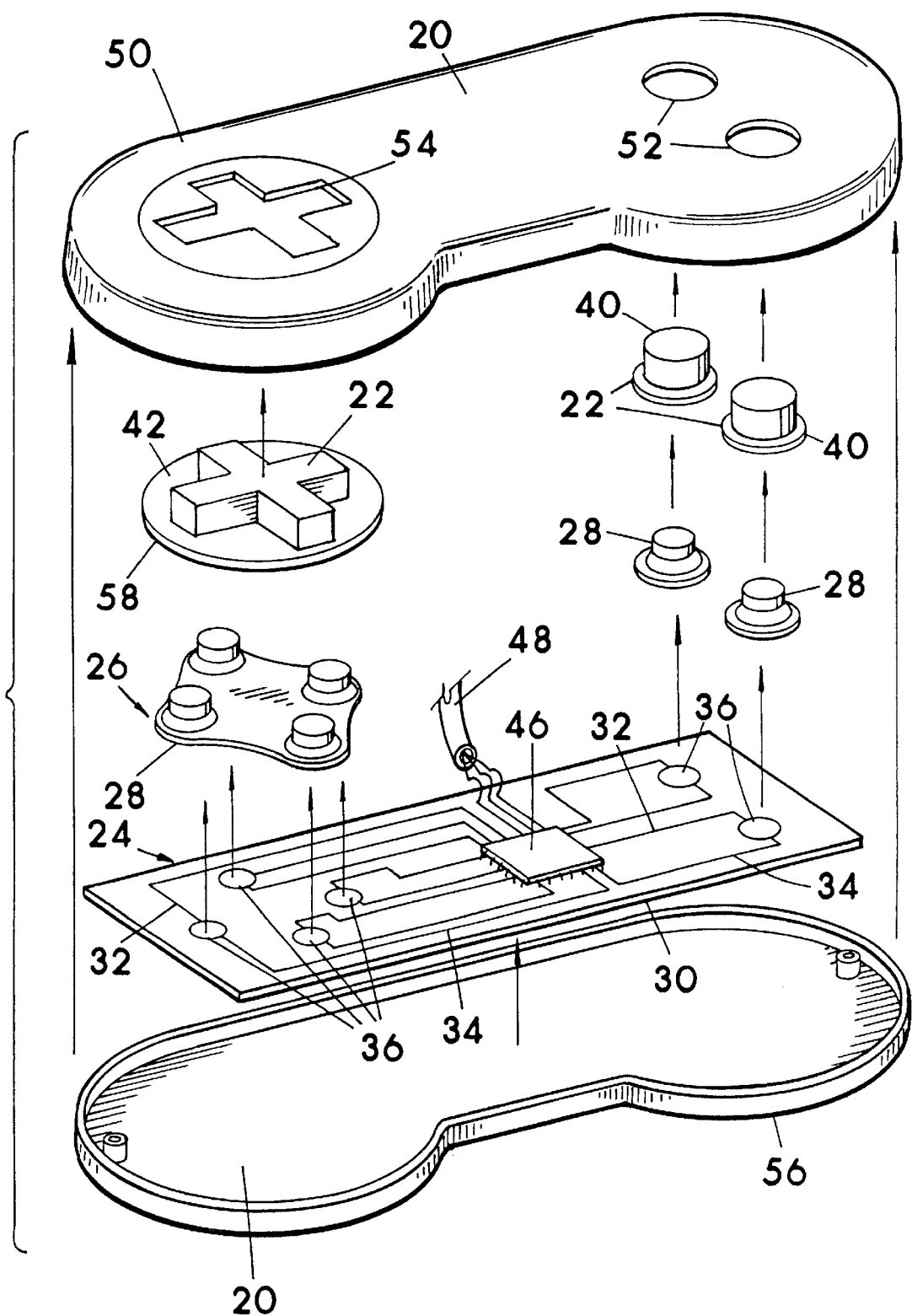
FIG. 9 shows an exploded view of one controller in accordance with the present invention.
Figure 11:
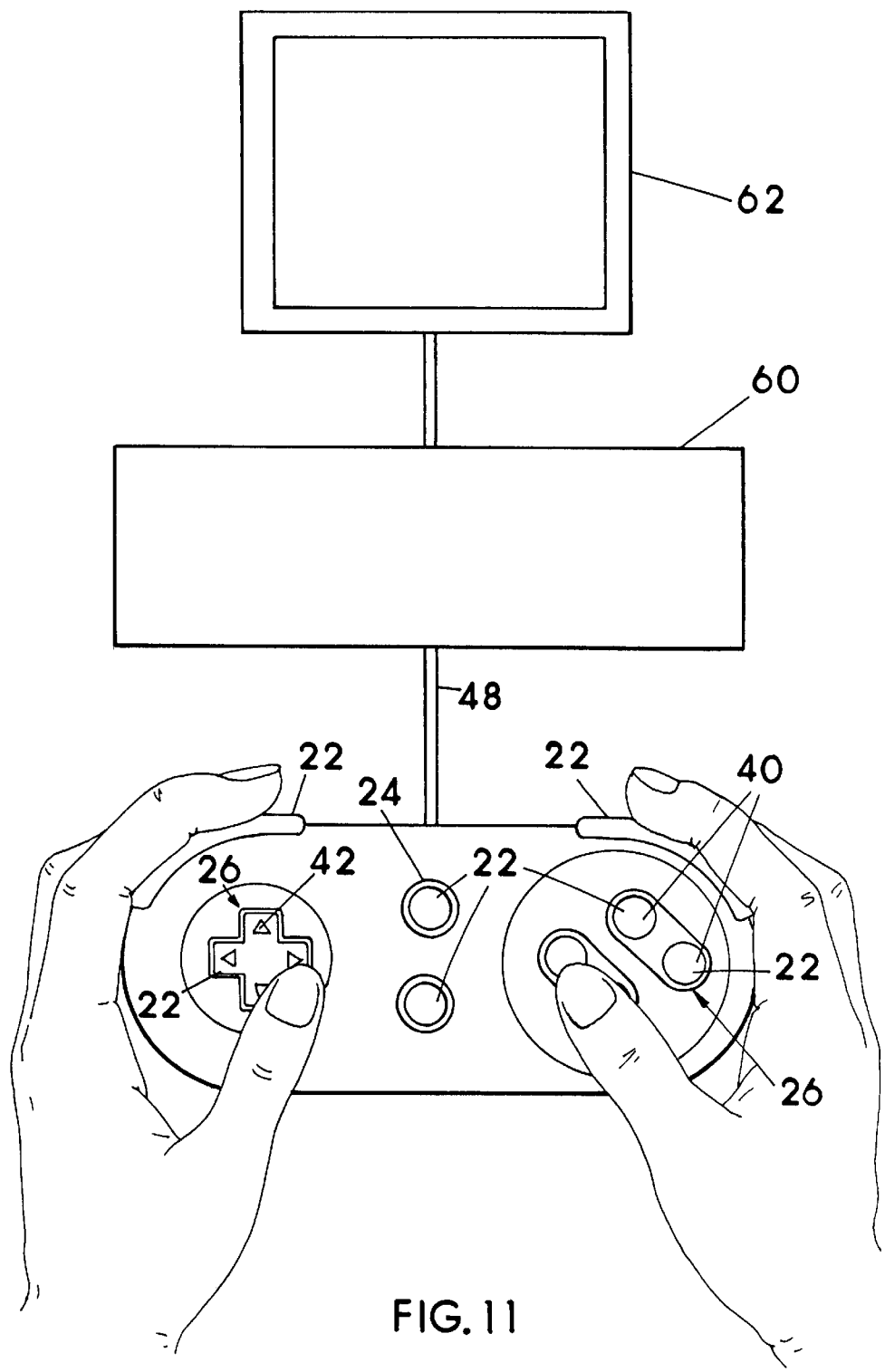
FIG. 11 shows a game controller of a traditional format in accordance with the present invention for example. The game controller is shown connected by wires to an image generation machine (game console or personal computer) which drives a display such as a television or computer monitor.

Depressible surface 22 can be a button 40 style depressible member such as shown in FIGS. 9 and 11, or depressible surface 22 can be an end portion of a four-way rocker or four-way key pad 42 as shown in FIGS. 9 and 11. For further clarity, depressible surface 22 and electricity manipulating device 24 are herein described and shown as separate elements, but they are only necessarily separate in a functional sense (i.e., physical depressing function verses electrical controlling function). In practical application, depressible surface 22 and electricity manipulating device 24 may be structured as one part. For example, the upper part of dome cap 28 protruding through housing 20 could itself be exposed to contact by a hand digit to function as the depressible surface 22 as shown for example in FIGS. 7 and 8.

Figure 4:
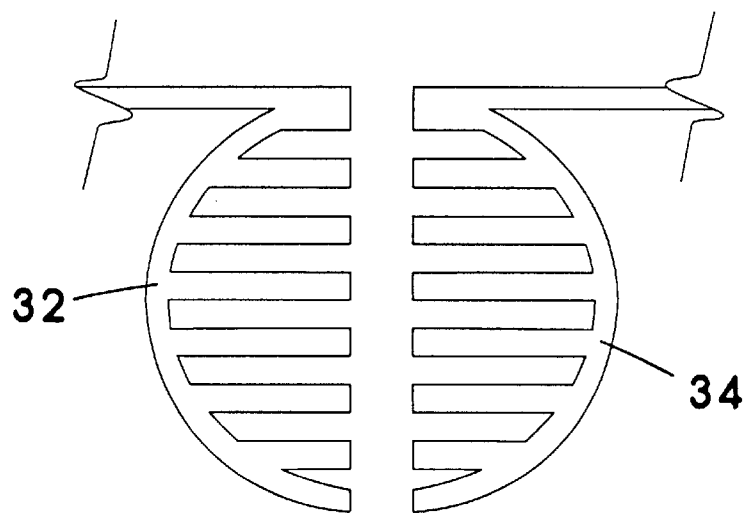
FIG. 4 shows a top view of first and second conductive traces with finger-like traces laying opposed in proximity with one another.

FIG. 4 shows first and second electrically conductive traces 32, 34 with finger-like traces laying in proximity with one another which can be the form of the first and second conductive traces 32, 34 of FIG. 3. The spacings between the conductive finger-like trace elements shown in FIG. 4 allow for adhesive which can be used to adhere a layer or disk of pressure-sensitive variable-conductance material 36 to circuit board 30 if so desired by the manufacturer.

Figure 5:
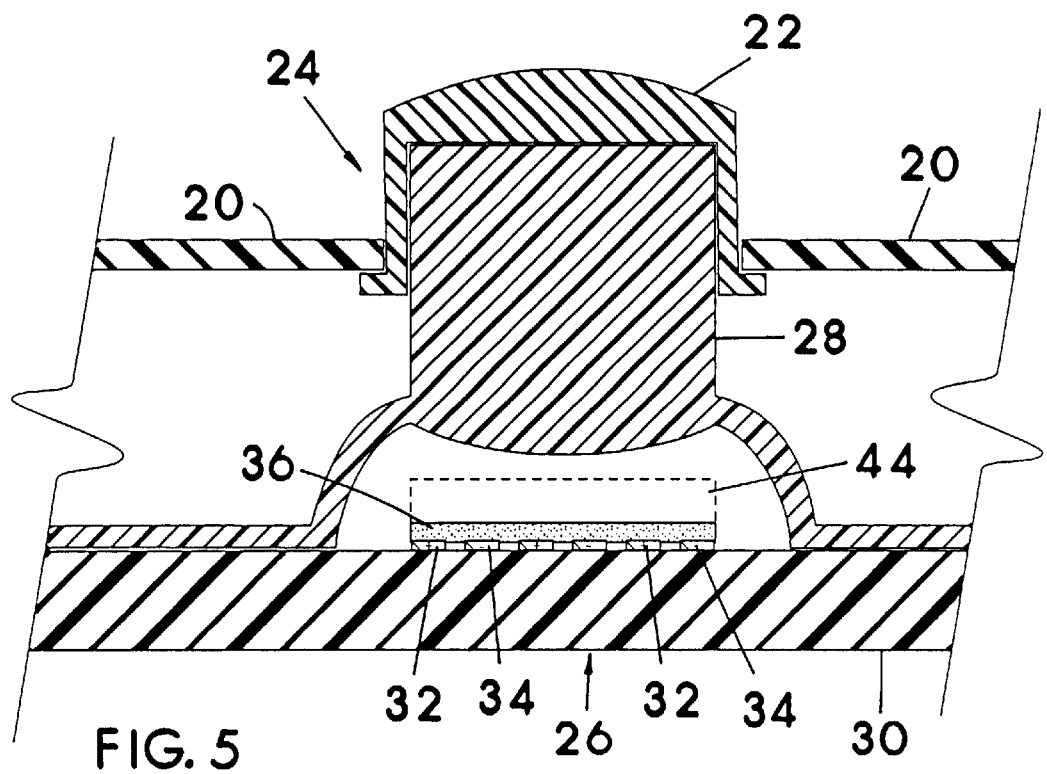
FIG. 5 shows a cross sectional view of a resilient dome cap operatively associated with pressure-sensitive variable-conductance material atop interdigitated traces on a circuit board in accordance with the present invention.

Shown in FIG. 5 is a second pressure-sensitive variable-conductance sensor 26 or analog sensor embodiment as it may be installed by a manufacturer within a game controller useful with the present invention. Resilient dome cap 28 is mounted over circuit board 30 having first and second circuit traces 32, 34 and including pressure-sensitive variable-conductance material 36 contacting both traces 32, 34. Optional plate 44 is shown atop pressure-sensitive variable-conductance material 36. An underside portion of depressible surface 22 is shown atop dome cap 28. Depressible surface 22 is shown in-part supported by housing 20, which in this example is housing 20 providing lateral support against the side of surface 22 and additionally with surface 22 including a lower flange abutting the underside of housing 20 and thereby being prevented from escaping housing 20. Optional plate 44 in this arrangement can be a stiff plate utilized as a physical load distributor to distribute compressive loads received from the underside of dome cap 28 with depression of depressible surface 22 across material 36 and not be an electrical conductor, or alternatively it can also be an electrical conductor dependant upon the particular thickness of material 36 and or spaced distance between circuit traces 32 and 34 beneath material 36. Plate 44 does not have to be applied atop material 36 in all embodiments. Circumstances which effect the determination as to whether plate 44 or conductive plate 38 for that matter are used atop material 36 include: the particular formula of material 36; dimensions of the applied material 36; the size, shaped proximity and layout of the circuit traces in contact with material 36, and manufacturing considerations such as is material 36 directly applied to plate 44 or 38 in an easily handled disk and then adhered to the circuit board 30, or applied directly to circuit board 30 and traces 32, 34 such as by application in a fluid mixture (uncured) using a removable mask; or directly injected onto circuit board 30 such as with injection molding; or a pill/disk of material 36 is sliced from a cured cylinder or extrusion of material 36 and the pill/disk adhered to circuit board 30 and/or traces 32, 34; and other manufacturing techniques.

Figure 6:
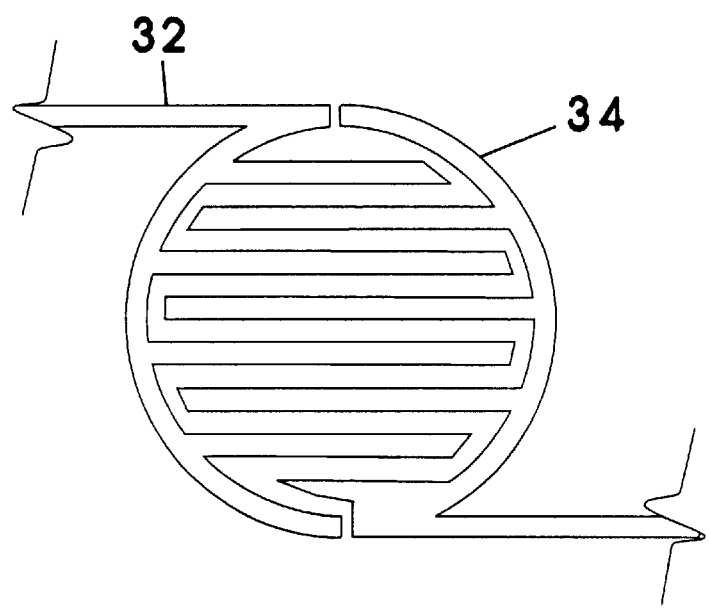
FIG. 6 shows a top view of first and second interdigitated circuit traces.
Figure 7:
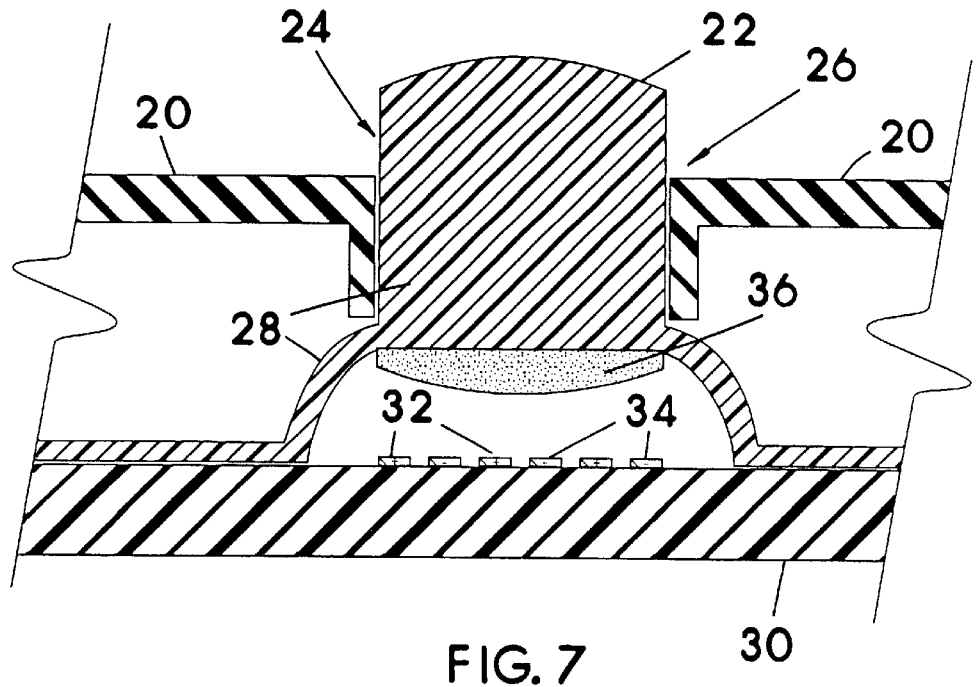
FIG. 7 shows a cross sectional view of a resilient dome cap supporting and operatively associated with pressure-sensitive variable-conductance material above interdigitated traces on a circuit board in accordance with the present invention.

FIG. 6 shows a top view of closely interdigitated circuit traces 32 and 34 in a form as may likely be used in the sensor structures shown in FIGS. 5, 7 and 8.

Shown in FIGS. 7 and 8 is a third pressure-sensitive variable-conductance sensor 26 formed as a depressible individual button which is an analog sensor embodiment as it may be installed by a manufacturer within a game controller or used by a user of the game controller in accordance with the present invention. Rubber dome cap 28 is mounted over circuit board 30 having first and second circuit traces 32, 34 and including pressure-sensitive variable-conductance material 36 on the bottom side of resilient dome cap 28. An upper exposed portion of dome cap 28 is exposed exterior of housing 20 so that depression by a thumb or finger of depressible surface 22 causes downward movement or depression of dome cap 28 to bring material 36 into contact with traces 32 and 34. Depressible surface 22 is shown in-part supported or laterally stabilized by housing 20. Material 36 is not permanently contacting traces 32 and 34 as is shown in FIGS. 3 and 5, but instead is on the underside of dome cap 28 in pill or disk form and raised or held upward above traces 32, 34 by dome cap 28 until, as indicated in FIG. 8, surface 22 is depressed to push dome cap 28 downward to bring material 36 into contact with traces 32, 34 which, under pressure, establishes a conductive path across traces 32, 34. Also shown in FIGS. 7 and 8 is the surface of material 36 which contacts traces 32 and 34 is convexed which in this particular application provides for the apex of the surface to first contact across traces 32 and 34 followed by material 36 which is flexible deforming with additional applied pressure to somewhat flatten-out and contact additional surface area of both traces 32 and 34. This arrangement of relatively lower initial surface area contact followed by additional or a larger surface area contact with further depression can provide additional conductivity changes due to not only the inherent conductivity changes brought about by pressure applied to material 36 but also by establishing additional current paths possible by the additional surface contact area. Material 36 in FIGS. 7 and 8 can be formed with a flat bottom surface and function adequately without the increasing surface area effect provided by the convexed shape shown. Additionally sensors 26 of FIGS. 3, 5, 7 and 8 will function within the scope of the invention absent the spring return effect of dome cap 28 wherein material 36 shown in FIG. 7 would be resting upon traces 32 and 34 and actuated by depression of surface 22.

In the prior art, typically a carbon-rich conductive pill or disk is located on the underside of a typical dome cap such as dome cap 28. In the prior art carbon-rich conductive pills are employed as simple On/Off momentary-On switches wherein the pill is depressed by the user onto and across circuit traces to close the circuit and released to open the circuit. In the prior art, the carbon-rich pill is a component of a switch that is only an On/Off switch. The prior art carbon-rich conductive pill is commonly used exclusively as an improved On/Off switch with the improvement being that this is considered a bounce-less switch not subjecting the circuitry to rapid on/off oscillations at the time of initial depression. Carbon-rich pills are typically made of granular carbon in high concentrations in a silicone rubber binder producing a resilient conductive material resistant to mechanical bouncing when depressed onto a surface. The carbon-rich pill is utilized to advantage in a simple On/Off bounce-less switch.

Such a carbon-rich pill, to my knowledge, has never been used or anticipated to be used for an analog sensor to provide action intensity control of electronic imagery. Neither, to my knowledge, has such a carbon-rich pill ever been used or anticipated to be used for an analog sensor in a two hand held game controller. I have discovered that such a carbon-rich pill or disk can be used, in a novel manner as taught herein, as an analog sensor in a game controller to provide action intensity control of electronic imagery such as that associated with electronic games. However, a narrow range of resistivity change found in a typical prior art carbon-rich pill as a function of depressive pressure exerted makes it not an ideal choice as an analog sensor in a human hand operated controller.

In the range of light depression by a typical user's thumb or finger (i.e., approximately one to six ounces) a carbon-rich pill as a variable resistor may typically have a range of resistance from a high value of approximately 3 thousand ohms to a low value near 10 ohms, which is a narrow range compared to a tungsten carbide based material 36 which may typically have a range from approximately 3 million ohms down to a low of approximately 10 ohms. Thus, the tungsten carbide based material 36 has a range of nearly 3 million ohms, while the carbon-rich pill has a range of nearly 3 thousand ohms, resulting in an improvement of three magnitudes (i.e., one thousand times) in range of the tungsten carbide material 36 over the carbon-rich pill.

Tungsten carbide having an extreme resistance range as a function of physical depressive pressure allows for greater variation (higher resolution) of physical pressure applied within those levels normal to light use by the thumb or finger of a typical human user. The variable resistance range of tungsten carbide is additionally quite stable over a wide temperature range. Tungsten carbide also has excellent wear characteristics and minimal hysteresis. Therefore, tungsten carbide is a preferred active material for use with the present invention.

Within the scope of the invention, material 36 can be manufactured and fixed in place with numerous processes not yet detailed, and for example, tungsten carbide can be mixed with un-crosslinked silicone rubber and extruded from a tool or pressed into a cylindrical mold, allowed to crosslink, and then cut or sliced into disks or pills of material 36 which can then be placed in appropriate location to circuit traces 32, 34 or on dome cap 28. Another process is to mix tungsten carbide or other suitable material with an injection moldable silicone rubber and then inject the material onto any desireable surface such as a membrane surface such as mylar, or circuit board 30 and traces 32, 34, or using an injection process for creating dome cap 28 with disks or pills of material 36 thereon, such as could be performed for the dome cap 28 and material 36 arrangement of FIGS. 7 and 8, or dome cap 28 can be a flexible/resilient dome cap and material 36 can be molded either onto the dome cap or onto the circuit board, etc. If a metal dome cap is used and is electrically conductive, one circuit trace such as trace 32 can make electrical contact with a foot of the dome cap and the second trace below the approximate center of the dome cap with material 36 positioned between the second trace and the center of the dome cap such that depression of the dome cap effectively sandwiches material 36.

FIG. 9 shows an exploded view of a controller in accordance with one embodiment of the present invention. Shown at the top of the view is an upper portion 50 of housing 20. Upper portion 50 of housing 20 includes on the right hand side a pair of circular holes 52 for receiving and in-part supporting (retaining) depressible surfaces 22 which in this example are buttons 40. On the left hand side of the housing top is a cross-shaped opening 54 through the housing for in-part receiving and supporting a four-way rocker 42 which is a depressible surface 22. The depressible surfaces when assembled into the housing are in-part exposed on the housing surface for depressing by the digits of the human hands. Shown below the housing upper portion 50 is rocker 42 and buttons 40. Additionally shown are individual rubber dome caps 28 beneath button 40 and a four-gang rubber dome cap 28 beneath rocker 42 having four codependant areas. Shown beneath the rubber dome caps is circuit board 30 having on its left side an array of circuit traces forming four areas including adjacent circuit traces 32 and 34 in close proximity to one another for operative engagement with material 36 installed by the manufacturer atop each of the four areas which are located such that the four-gang rubber dome cap can be applied over the four locations of material 36 to provide a dome cap over each material 36 location. Rocker 42 can then be located atop the four-gang rubber dome cap so that one dome cap is located underneath each one of the four arm structures (four codependant areas) of rocker 42. Each arm of rocker 42 is placed one arm above each of the four locations of material 36. Rocker 42 is supported elevated above material 36 by dome caps, and when housing 20 is fully assembled with a lower portion 56 of housing, a flange 58 on the lower outward edge of rocker 42 prevents rocker 42 from completely passing through cross-shaped hole 54. Shown on the right side of circuit board 30 are two locations of applied material 36 installed by the manufacturer over separated yet in close proximity to circuit traces 32 and 34. The two individual dome caps 28 will be placed one over each material 36 location of the right side of the board 30, and button 40 positioned onto dome caps 28, the upper surfaces of buttons 40 positioned through holes 52 and housing 20 and circuit board 30 connected to one another and housing 20 closed with upper portion 50 and lower portion 56 affixed together. Also shown on circuit board 30 is circuit traces 32 and 34 connecting to active electronics 46 installed by the manufacturer and electronics 46 having the capacity to output a signal at least representational of the analog electrical output of pressure-sensitive variable-conductance sensor(s) 26 into output cable 48 leading to an image generation machine 60 such as a game console or computer connected to a display (FIG. 11). Active electronics 46 (i.e., ASIC or micro-controller integrated circuity, etc.) which in addition to having normal circuitry of a typical game controller such as a prior art controller also has circuitry for interpreting the analog output of sensor material 36 and converting it into a digital signal (if a digital signal is desired) which is output to a host graphic generation machine via cable 48. For the sake of brevity and because it is well known to those skilled in the art, this disclosure does not detail converting analog to digital signals, i.e., specifically converting the output of sensors 26 to a digital signal or form for control of imagery. It is conceivable that within the scope of the invention, circuit traces 32 and 34 could simply be connected directly to conductors of cable 48 for outputting a signal at least representational of the analog electrical output of pressure-sensitive variable-conductance sensor(s) 26 through output cable 48 into an image generation machine 60 wherein active electronics 46 may be located.

Figure 10:
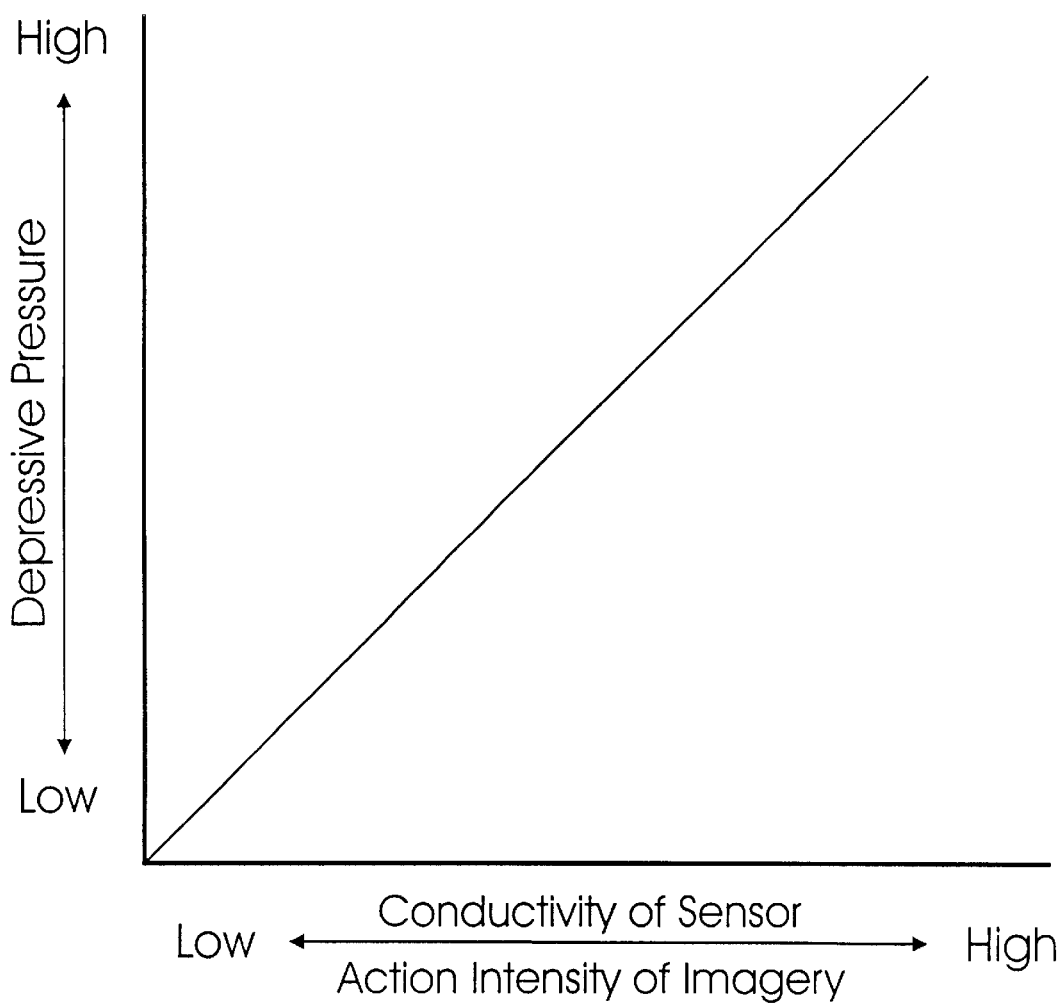
FIG. 10 is a graph illustrating depressive pressure in relation or in proportion to the conductivity of a pressure sensor, which typically corresponds to action intensity of imagery on the game display.

FIG. 10 shows an idealized graph indicating conductivity of pressure-sensitive variable-conductance sensor such as sensor 26 and the corresponding action intensity of imagery in a game machine as a function of depressive pressure exerted by the thumb or fingers (digit) onto the depressible surfaces of a game controller as herein described. The graph shows that with a low depressive pressure, the conductivity is also low (resistivity high), and action intensity of imagery would normally be arranged to be low since the typical user will normally naturally associate low applied pressure with low action intensity. As depressive pressure increases so also increases the conductivity (resistivity lowering) proportionally in a smooth continuous change or analog manner so as to provide a variable electrical output.

Examples of typical left thumb use of the invention in a game can be to simply have a simulated character shown on the display walk with low depressive pressure applied to a depressible surface 22 of sensor 26, walk faster with increased depressive pressure applied to the depressible surface 22, and run with a relatively high depressive pressure applied to the same depressible surface 22, with this being an example of controlling or changing the action intensity of the imagery proportionally with changes in depressive pressure applied to depressible surface 22 of sensor 26. The user can choose the action intensity of imagery by applying appropriate depressive pressure. In a second example, a race car can veer slightly with a low depressive pressure applied to surface 22 of sensor 26 and turn sharply with a high depressive pressure applied to the same depressible surface 22. In a typical right thumb use and an example of use of the invention, variable depressive pressure can control variable fire rate of a gun or variable jumping height of a character shown as an image on display 62. Alternatively, the invention in combination with an electronic game console or PC and display can be arranged so the action intensity of the imagery is reduced proportionally to increases or increasing depressive pressure applied on depressible surface 22 of sensor 26 wherein a simulated race car shown on the display travels at a high rate with little or no depressive pressure applied to surface 22, and is slowed proportionally to increased or increasing depressive pressure applied by the user to the depressible surface 22 of sensor 26, an arrangement wherein the sensor 26 is applied as a braking system.

FIG. 11 shows a game controller of a traditional format in accordance with the present invention for example. The game controller is shown connected by cable 48 to an image generation machine 60 such as a game console or personal computer which drives a display 62 such as a television, computer monitor or head-mount display, etc.

Although I have very specifically described preferred structures and best modes (methods) of the invention, it should be understood that the specific details are given for example to those skilled in the art. Many changes in the described specifics can clearly be made without departing from the scope of the invention, and therefore it should be understood that the scope of the invention is not to be overly limited by the specification and drawings given for example, but is to be determined by the spirit and scope and broadest possible interpretation of the attached claims.

I claim:

1. An improved method of using a two hand held game controller structured with a housing formed to be held by a user in two hands simultaneously, said housing having a left-hand area and a right-hand area, located in said left-hand area is a depressible pad having four codependant areas, located in said right-hand area is a plurality of single individual depressible buttons; said game controller for controlling a simulated game character by way of depressing a portion of said depressible pad and depressing said single individual depressible buttons; a television displaying said simulated game character;

wherein the improved method comprises the steps:
providing at least two Qf said depressible buttons as pressure-sensitive buttons;
depressing said portion of said depressible pad for at least in part controlling said simulated game character;
depressing a first one of said pressure-sensitive with varying pressure for at least in part varying action intensity of said simulated game character;
depressing a second one of said pressure-sensitive with varying pressure for at least in part varying action intensity of said simulated game character.

2. An improved method of using a two hand held game controller according to claim 1 wherein the action intensity is at least represented by movement speed of said game character, wherein said game character moves at a first speed with a first depressive pressure, said game character moves at a second speed with a second depressive pressure, said second depressive pressure is greater than said first depressive pressure, and said second speed is different from said first speed.

3. An improved method of using a two hand held game controller according to claim 1 wherein the action intensity is at least represented by jumping height of said game character, wherein a first depressive pressure causes said character to jump a first height, and a second depressive pressure causes said character to jump a second height.

4. An improved method of using a two hand held game controller according to claim 1 wherein said game character is a simulated car, said car is slowed proportionally to increasing depressive pressure.

5. An improved method of using a two hand held game controller according to claim 1 wherein said game character is a simulated gun, said varying pressure for varying fire rate of said gun.

6. An improved method of using a two hand held game controller structured with a housing formed to be held by a user in two hands simultaneously, said housing having a left-hand area and a right-hand area, located in said right-hand area is a plurality of single individual depressible buttons; said game controller for controlling a simulated game character by way of depressing said single individual depressible buttons;

wherein the improved method comprises the steps:
providing at least two of said depressible buttons as pressure-sensitive buttons;
depressing a first one of said pressure-sensitive with varying degrees of pressure for at least in part varying action intensity of said simulated game character;
depressing a second one of said pressure-sensitive with varying degrees of pressure for at least in part varying action intensity of said simulated game character.

7. An improved method of using a two hand held game controller according to claim 6 wherein the action intensity is at least represented by jumping height of said game character, wherein a first depressive pressure causes said character to jump a first height, and a second depressive pressure causes said character to jump a second height.

8. An improved method of using a two hand held game controller according to claim 7 wherein said housing further supports in said left-hand area a depressible pad having four codependant areas, and
wherein the improved method comprises the step:
depressing a portion of said depressible pad for at least in part controlling said simulated game character.

9. An improved method of using a two hand held game controller according to claim 6 wherein said game character is a simulated car, said car is slowed proportionally to increasing depressive pressure.

10. An improved method of using a two hand held game controller according to claim 9 wherein said housing further supports in said left-hand area a depressible pad having four codependant areas, and
wherein the improved method comprises the step:
depressing a portion of said depressible pad for at least in part steering said car.

11. An improved method for controlling game imagery with a game control, said game control at least in part controlling imagery created by an image generation machine,
said game control of the type having a housing designed to be held in two hands simultaneously, said housing having a right-hand area and a left-hand area, located in said right-hand area are depressible single individual buttons, said buttons positioned to be depressed by a user's right hand thumb, depression of said buttons is for controlling said imagery; said improvement comprises the step of:
providing variable action intensity of said game imagery at least in part controlled by pressure-sensitive variable-conductance of one of said buttons.

12. An improved method for controlling game imagery with a game control according to claim 11 wherein said improvement further comprises the step of:
providing variable action intensity of said game imagery at least in part controlled by pressure-sensitive variable depression of a second one of said buttons,
providing for said buttons to depress pressure-sensitive variable-conductance material.

13. An improved method for controlling game imagery with a game control according to claim 12 wherein said improvement further comprises the step of:
providing variable action intensity of said game imagery at least in part controlled by pressure-sensitive variable depression of a third one of said buttons.

14. An improved method for controlling game imagery with a game control according to claim 13 wherein said improvement further comprises the step of:
providing variable action intensity of said game imagery at least in part controlled by pressure-sensitive variable depression of a fourth one of said buttons.

15. An improved method for controlling game imagery with a game control according to claim 14 wherein said improvement further comprises the step of:
providing variable action intensity of said game imagery at least in part controlled by pressure-sensitive variable depression of a fifth one of said buttons.

16. An improved method for controlling game imagery with a game control according to claim 12 further wherein said housing supports in said left-hand area a depressible pad having four codependant areas, and
wherein the improved method comprises the step:
depressing a portion of said depressible pad for at least in part controlling said game imagery.

17. An improved method for controlling game imagery with a game control according to claim 16, wherein said image generation machine is a game console.

18. An improved method for controlling game imagery with a game control according to claim 17, wherein said game imagery includes a simulated game character.

19. An improved method for controlling game imagery with a game control according to claim 18, wherein said variable depression of one of said buttons causes variable jumping height of said game character.

20. An improved method for controlling game imagery with a game control according to claim 18, wherein said variable depression of one of said buttons causes variable firing rate of said game character.

21. An improved method for controlling game imagery with a game control according to claim 18, wherein said simulated game character is a vehicle and said variable depression of one of said buttons causes variable speed of said vehicle.

22. An improved method for controlling game imagery with a game control according to claim 21, wherein said vehicle is a race car.

23. A game control comprising:
a housing to be grasped and held simultaneously by two hands of a human user during use, said housing including a right-hand area and a left-hand area, said right-hand area being an area for grasping by the user's right hand, said left-hand area being an area for grasping by the user's left hand;
a plurality of depressible electricity manipulating devices each at least in-part exposed on said housing, at least some of said plurality of electricity manipulating devices positioned on said housing to be within reach of the user's right-hand thumb;
at least one of said electricity manipulating devices is a pressure-sensitive variable-conductance sensor operable by a depressible individual button located within said right-hand area and reachable by the user's right-hand thumb, said variable-conductance sensor including means for creating an analog electrical signal representing varying applied physical pressure;

at least one of said electricity manipulating devices including means for creating an On/Off signal; each of said electricity manipulating devices electrically connected to electronics means for at least reading the signals of said electricity manipulating devices.

24. A game control according to claim 23 wherein said electronics means further for reading said at least one of said electricity manipulating devices including means for creating an On/Off signal, exclusively as an On/Off switch.

25. A game control according to claim 23 wherein the signals represent operation of said variable-conductance sensor.

26. A game control according to claim 23 wherein said electronics means includes an ASIC, and said pressure-sensitive variable-conductance sensor further includes a resilient dome cap carrying a conductive material on an underside of said dome-cap, said conductive material having a deformable shaped surface, wherein with a first level of applied pressure to said button said deformable shaped surface establishes a first electrical contact area, with a second level of applied pressure to said button said deformable shaped surface establishes a second electrical contact area, said second electrical contact area is larger than said first electrical contact area and electrical resistance of said sensor is larger with said first level of applied pressure than the electrical resistance of said sensor with said second level of applied pressure.

27. A game control according to claim 26 wherein at least four of said electricity manipulating devices are pressure-sensitive variable-conductance sensors operable by four depressible individual buttons located within said right-hand area and reachable by the user's right-hand thumb.

28. A game control according to claim 23 wherein said electronics means is further for reading at least one of said electricity manipulating devices exclusively as an On/Off switch.

29. A game control according to claim 23 wherein at least two of said electricity manipulating devices are pressure-sensitive variable-conductance sensors operable by two depressible individual buttons located within said right-hand area and reachable by the user's right-hand thumb, and said sensors include pressure-sensitive variable-conductance material.

30. A game control according to claim 28 wherein said electronic means also is for outputting to a game console information representing the signals, and the signals represent operation of said pressure-sensitive variable-conductance sensor.

31. A game control according to claim 30 wherein said electronic means includes an ASIC, and said sensor includes pressure-sensitive variable-conductance material.

32. A game control according to claim 31 wherein at least four of said electricity manipulating devices are pressure-sensitive variable-conductance sensors operable by four depressible individual buttons located within said right-hand area and reachable by the user's right-hand thumb.

33. A game control according to claim 30 wherein said pressure-sensitive variable-conductance sensor includes conductive trace means for conducting electricity.

34. A game control according to claim 33 wherein said conductive trace means includes a first circuit trace and a second circuit trace, the traces connected by a conductive material.

35. A game control comprising:
a housing to be grasped and held simultaneously by two hands of a human user during use, said housing including a right-hand area and a left-hand area, said right-hand area being an area for grasping by the user's right hand, said left-hand area being an area for grasping by the user's left hand;

a plurality of depressible electricity manipulating devices each at least in-part exposed on said housing;

at least one of said electricity manipulating devices positioned within said right-hand area is a pressure-sensitive variable-conductance sensor actuated by a single independent button, said sensor comprising:
a depressible resilient dome cap positioned over
conductive material positioned in proximity to
circuit trace means for conducting electricity, said resilient dome cap depressible to electrically contact said conductive material with said circuit trace means, said pressure-sensitive variable-conductance sensor for creating analog output proportional to varying physical pressure applied to said sensor; said sensor electrically connected to
active electronics means for interpreting the analog output of said pressure-sensitive variable-conductance sensor.

36. A game control according to claim 35 wherein an inner surface of said dome-cap has an apex.

37. A game control according to claim 36 wherein said dome-cap is flexible and under increasing pressure said apex flattens to contact additional surface area to provide conductivity changes of said sensor.

38. A game control according to claim 35 wherein said conductive material is carried within said dome-cap, said conductive material is shaped to include an apex.

39. A game control according to claim 38 wherein said conductive material is flexible and said apex flattens with additional physical pressure causing additional contact area for providing resistance changes of said sensor.

40. A game control comprising:
a housing to be grasped and held simultaneously by two hands of a human user, said housing including a right-hand area and a left-hand area, said right-hand area being an area for grasping by the user's right hand, said left-hand area being an area for grasping by the user's left hand;

a plurality of depressible electricity manipulating devices each at least in-part exposed on said housing;

at least one of said electricity manipulating devices is a pressure-sensitive variable-conductance sensor located in said right-hand area for being depressed by the user's right-hand digit, said pressure-sensitive variable-conductance sensor including means for creating an On/Off output, and with varied pressure creating an analog output;

active electronics means for at least interpreting the outputs of said pressure-sensitive variable-conductance sensor.

41. A game control according to claim 40 wherein said electronics means includes an ASIC, and said pressure-sensitive variable-conductance sensor includes flexible material having a substantially convex surface, said material deforming with additional pressure to flatten causing contact of additional surface area to provide conductivity changes of said sensor.

42. A game control according to claim 41 wherein at least two of said electricity manipulating devices are pressure-sensitive variable-conductance sensors operable by two depressible individual buttons located within said right-hand area and reachable by the user's right-hand thumb.

43. A game control according to claim 40 wherein at least two of said electricity manipulating devices are pressure-sensitive variable-conductance sensors operable by two depressible individual buttons located within said right-hand area and reachable by the user's right-hand thumb.

44. A game control comprising:
a housing to be grasped and held simultaneously by two hands of a human user during use, said housing including a right-hand area and a left-hand area, said right-hand area being an area for grasping by the user's right hand, said left-hand area being an area for grasping by the user's left hand;
a plurality of depressible electricity manipulating devices each at least in-part exposed on said housing;
at least one of said electricity manipulating devices positioned within said right-hand area is a pressure-sensitive analog sensor actuated by variable depression of a single individual button, said analog sensor comprising:
a depressible resilient dome cap, said dome cap positioned over
a sheet, said sheet positioned over
a board;
said game control further including means for reading a signal from said analog sensor;
means for outputting information representing said signal.

45. A game control according to claim 44 wherein said board is a circuit board supporting electrical circuit traces.

46. A game control according to claim 45 wherein said dome cap has a deformable substantially convexed surface having an apex located to contact said sheet.

47. A game control according to claim 46 wherein said sheet is a non-conductive sheet supporting conductive material.

48. A game control according to claim 47 wherein said conductive material is located to contact said circuit traces.

49. A game control according to claim 47 wherein said circuit traces are interdigitated.

50. A game control according to claim 49 wherein said conductive material is pressure-sensitive variable-conductance material, and a four way rocker is located in said left-hand area of said housing.

51. A game control according to claim 50 wherein said game control at least in part controls
an image generation machine,
said means for outputting information communicates from said game control to said image generation machine.

52. A game control according to claim 51 wherein said image generation machine is a game console at least in part for controlling imagery displayed by a television.

53. A game control according to claim 52 wherein a second analog sensor is positioned within said right-hand area of said housing, said second analog sensor actuated by variable depression of a second single individual button.

54. A game control according to claim 44 wherein said dome cap supports conductive material.

55. A game control according to claim 54 wherein said conductive material has a deformable substantially convexed surface having an apex.

56. A game control according to claim 55 wherein said sheet is a non-conductive sheet supporting conductive material.

57. A game control according to claim 56 wherein said conductive material is contacting circuit traces.

58. A game control according to claim 57 wherein said circuit traces comprise a first circuit trace and a second circuit trace, said conductive material contacting between said first circuit trace and said second circuit trace.

59. A game control according to claim 58 wherein a four way rocker is located in said left-hand area of said housing.

60. A game control according to claim 59 wherein said game control at least in part controls
an image generation machine,
said means for outputting information communicates from said game control to said image generation machine.

61. A game control according to claim 60 wherein said image generation machine is a game console at least in part for controlling imagery displayed by a television.

62. A game control according to claim 61 wherein a second analog sensor is positioned within said right-hand area of said housing, said second analog sensor actuated by variable depression of a second single individual button.

63. A game control according to claim 62 wherein a third analog sensor is positioned within said right-hand area of said housing, said third analog sensor actuated by variable depression of a third single individual button.

64. A game control according to claim 63 wherein said conductive material is pressure-sensitive variable-conductance material, and a fourth analog sensor is positioned within said right-hand area of said housing, said fourth analog sensor actuated by variable depression of a fourth single individual button.

65. A game control according to claim 64 wherein a fifth analog sensor is positioned within said right-hand area of said housing, said fifth analog sensor actuated by variable depression of a fifth single individual button.

66. A pressure-sensitive variable-conductance sensor for a control device, said sensor comprising;
a depressible resilient dome cap having a surface with an apex positioned above
circuit trace means for conducting electricity, said resilient dome cap depressible for creating analog output proportional to varying physical pressure applied to said dome cap; said surface with an apex is flexible, deforming with additional physical pressure to flatten and cause additional surface area contact to provide changes in electrical conductivity in said sensor; said sensor electrically connected to
active electronics means for interpreting the electrical conductivity of said sensor.

67. A pressure-sensitive variable-conductance sensor for a control device according to claim 66 wherein said sensor is depressible by force applied by a single digit of a human user's hand.

68. A pressure-sensitive variable-conductance sensor for a control device according to claim 67 wherein said active electronics means at least includes an ASIC, and said electrical conductivity is resistive in nature.

69. A pressure-sensitive variable-conductance sensor for a control device according to claim 67 wherein said control device is a game control device including a housing to be grasped and held simultaneously by two hands of the human user during use, said housing including a right-hand area and a left-hand area, said right-hand area being an area for at least grasping by the user's right hand, said left-hand area being an area for at least grasping by the user's left hand, said sensor located in said right-hand area to be depressed by the human user's right-hand thumb.

70. A method of manufacturing a game control, including the steps:
a) providing a housing shaped to be held simultaneously by two hands of a human user, said housing formed with a right-hand area and a left-hand area;

b) assembling electronics into said housing;

c) installing electricity manipulating devices connected to said electronics;

d) positioning said electricity manipulating devices in-part exposed on said housing to be depressed by digits of the human user's hand;

e) installing into said right-hand area of said housing at least two single individual button depressible pressure-sensitive variable-conductance analog sensors, said sensors connected to said electronics, said sensors independently depressible by a single digit of a human user's right hand.

71. A method of manufacturing a game control according to claim 70 further including the step installing resilient dome caps located to be operational with pressure-sensitive material of said pressure-sensitive variable-conductance analog sensors.

72. A method of manufacturing a game control according to claim 70 further including the step installing injection molded rubber dome caps located to be operational with said pressure-sensitive variable-conductance analog sensors.

73. A method of manufacturing a game control according to claim 72 further including the step installing in said left-hand area of said housing a depressible pad associated with four of said electricity manipulating devices.

74. A method of manufacturing a game control according to claim 73 including the step: providing said pressure-sensitive variable-conductance analog sensors with conductive material having a convexed surface, and further, providing said conductive material as flexible material deformable with physical pressure to increase contact area resulting in lowering electrical resistance.

* * * * *

INTER PARTES REEXAMINATION CERTIFICATE (0124th)
United States Patent
Armstrong

(10) Number: US 6,343,991 C1
(45) Certificate Issued: *Dec. 15, 2009

(54) GAME CONTROL WITH ANALOG PRESSURE SENSOR

(75) Inventor: Brad A. Armstrong, Paradise, CA (US)

(73) Assignee: Anascape, Ltd., Tyler, TX (US)

Reexamination Request:
No. 95/000,223, May 10, 2007

Reexamination Certificate for:
Patent No.: 6,343,991
Issued: Feb. 5, 2002
Appl. No.: 09/510,572
Filed: Feb. 22, 2000

(*) Notice: This patent is subject to a terminal disclaimer.

Related U.S. Application Data

(63) Continuation of application No. 08/942,450, filed on Oct. 1, 1997, now Pat. No. 6,102,802.

(51) Int. Cl.
*G09G 5/00* (2006.01)

(52) U.S. Cl. .......................................... 463/37
(58) Field of Classification Search ................. None
See application file for complete search history.

(56) References Cited

U.S. PATENT DOCUMENTS

| | | | |
|---|---|---|---|
| 3,806,471 A | 4/1974 | Mitchell | |
| 4,314,227 A | 2/1982 | Eventoff | |
| 4,315,238 A | 2/1982 | Eventoff | |
| 4,419,653 A | 12/1983 | Waigand | |
| 4,489,302 A | 12/1984 | Eventoff | |
| 4,490,587 A | 12/1984 | Miller | |
| 4,604,509 A | 8/1986 | Clancy | |
| 4,775,574 A | 10/1988 | Fukushima et al. | |
| 5,164,697 A | 11/1992 | Kramer | |
| 5,207,426 A | 5/1993 | Inoue | |
| 5,252,971 A | 10/1993 | Franz | |
| 5,296,837 A | 3/1994 | Yaniger | |
| 5,510,812 A | 4/1996 | O'Mara et al. | |
| 6,102,802 A | 8/2000 | Armstrong | |

FOREIGN PATENT DOCUMENTS

| | | |
|---|---|---|
| JP | H1-62627 | 4/1989 |
| JP | H1-40545 | 12/1989 |
| JP | H05-190051 | 7/1993 |
| JP | H5-87760 | 11/1993 |
| JP | H05-326217 | 12/1993 |
| JP | H06-154422 | 6/1994 |
| JP | H6-56740 | 8/1994 |
| JP | H7-112073 | 5/1995 |
| JP | H08-222070 | 8/1996 |

OTHER PUBLICATIONS

Civil Action No. 9:06–158, Anascape's Opening Claim Construction Brief, Part I, May 4, 2007.
Civil Action No. 9:06–158, Anascape's Reply Claim Construction Brief, Part I, Jun. 1, 2007.
Civil Action No. 9:06–158, Microsoft's Claim Construction Brief, PSVC Patents, May 21, 2007.

(Continued)

*Primary Examiner*—Beverly M. Flanagan

(57) ABSTRACT

A game controller of the type held in two hands simultaneously for controlling electronic games, including a housing, a plurality of depressible surfaces at least in-part exposed on the housing with the depressible surfaces in operational association with electricity manipulating devices contained within the housing and controlled by depression of the depressible surfaces for manipulating electrical outputs at least in-part useful for controlling electronic games. At least one of the electricity manipulating devices is a pressure-sensitive variable-conductance sensor for creating an analog electrical output proportional to varying physical pressure applied to at least one depressible surface. The analog electrical output is interpreted and utilized in controlling the action intensity of electronic game character imagery. Also disclosed are methods of use and manufacture of game controllers having at least one pressure-sensitive analog sensor.

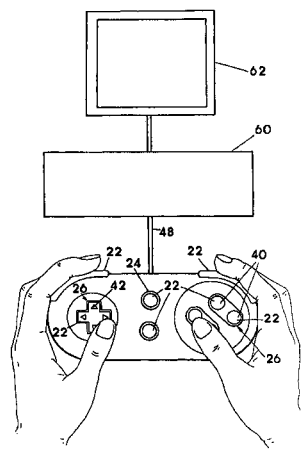

OTHER PUBLICATIONS

Defendant Microsoft Corporation's Second Amended Answer, Defenses and Counterclaims to Plaintiff's First Amended Complaint, filed Dec. 3, 2007.

Anascape Ltd.'s Objections and Response to Microsoft Corp.'s First Set of Interrogatories (Nos. 1–26), served on or about Nov. 19, 2007, at p. 19.

Anascape Ltd.'s Objections and Responses to Microsoft Corp.'s Second Set Requests For Addmissions, served on or about Nov. 19, 2007, at pp. 4–14.

Memorandum Opinion and Order Constructing Claim Terms of United States Pat. Nos. 5,999,084; 6,102,802; 6,135,886; and 6,343,991, dated Nov. 30, 2007.

Sony Patent License Agreement, Apr. 2004.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 23–34 and 40–43 is confirmed.

Claims 1–22, 35–39 and 44–74 are cancelled.

\* \* \* \* \*